United States Patent
Hussain

(10) Patent No.: US 7,307,966 B2
(45) Date of Patent: Dec. 11, 2007

(54) SYSTEM AND METHOD FOR PROVIDING AN IP CORE NETWORK FOR WIRELESS/WIRELINE INTEGRATION

(75) Inventor: Aamir M. Hussain, Denver, CO (US)

(73) Assignee: Qwest Communications International, Inc., Denver, CO (US)

( * ) Notice: Subject to any disclaimer, the term of this patent is extended or adjusted under 35 U.S.C. 154(b) by 1136 days.

(21) Appl. No.: 09/963,070

(22) Filed: Sep. 24, 2001

(65) Prior Publication Data

US 2003/0058825 A1    Mar. 27, 2003

(51) Int. Cl.
*H04B 7/00*    (2006.01)
(52) U.S. Cl. ............... 370/310.1; 370/329; 370/338; 370/352; 455/450
(58) Field of Classification Search ............ 370/310, 370/329, 337, 338, 352, 353, 354, 310.1; 455/445, 450
See application file for complete search history.

(56) References Cited

U.S. PATENT DOCUMENTS

| | | | |
|---|---|---|---|
| 6,392,999 B1 * | 5/2002 | Liu et al. | 370/260 |
| 6,490,451 B1 * | 12/2002 | Denman et al. | 455/436 |
| 6,567,667 B1 * | 5/2003 | Gupta et al. | 455/445 |
| 6,704,287 B1 * | 3/2004 | Moharram | 370/242 |
| 6,721,306 B1 * | 4/2004 | Farris et al. | 370/352 |
| 6,768,726 B2 * | 7/2004 | Dorenbosch et al. | 370/331 |
| 2002/0191557 A1 * | 12/2002 | Chow et al. | 370/329 |
| 2006/0245399 A1 * | 11/2006 | Holur et al. | 370/335 |

* cited by examiner

*Primary Examiner*—Chi Pham
*Assistant Examiner*—Shick Hom
(74) *Attorney, Agent, or Firm*—Townsend and Townsend and Crew, LLP

(57) ABSTRACT

A wireless core network for communicating voice and data packets through a packet based protocol is provided. The network includes a wireless gateway, a packet switched network, and a Radio Frequency (RF) network. The RF network is coupled to the wireless gateway and communicates voice packets to the wireless gateway through a packet based protocol. Additionally, the RF network is coupled to the packet switched network and communicates data packets to the packet switched network through a packet based protocol.

6 Claims, 2 Drawing Sheets

SYSTEM AND METHOD FOR PROVIDING AN IP CORE NETWORK FOR WIRELESS/WIRELINE INTEGRATION

BACKGROUND OF THE INVENTION

The present invention relates generally to wireless telephony systems and more specifically to an IP core network for a wireless/wireline telephony network.

With the advent of the internetwork of networks generally referred to as the Internet, next generation services leveraging the Internet are being developed. For example, next generation services, such as unified messaging and instant messaging, include services based on location technology and IP telephony.

Unified messaging allows a user to access voice and data services, such as voicemail, email, facsimiles, etc., from several different devices. For example, a user may access email, voicemail, and faxes from a computer and also access email and voicemail from a cellular phone. Thus, unified messaging services transmit data, voice, and possibly video through networks.

Instant messaging allows users to send "instant" messages between themselves. The instant messages appear in real-time and allow users to hold conversations using devices such as computers, handheld computers, cellular telephones, and other wireless and internet connectable devices. In addition to exchanging instant messages, users may allow make voice calls and transmit or download data and/or video using their instant messenger. Thus, unified messaging services transmit data, voice, and possibly video through networks.

Accordingly, with the increase of services leveraging both voice and data, separate networks designed to just handle voice or data do not provide a seamless integration of voice and data transmission. For example, a narrow band switch-based Time Division Multiplex (TDM) voice network connected to a switch-based wireless network may be able to handle voice calls. However, the switch-based TDM and wireless networks, which are enabled to provide traditional voice services, do not seamlessly support next generation voice and data services. Additionally, separate wireless and wireline switch based voice and data networks typically are used for voice and data services. Accordingly, next generation services designed for transmission of voice and data are not immediately integrated into the switch-based networks.

BRIEF SUMMARY OF THE INVENTION

A wireless core network for communicating voice and data packets through a packet based protocol is provided in one embodiment of the invention. In one embodiment, the network includes a wireless gateway, a packet switched network, and a Radio Frequency (RF) network. The RF network is coupled to the wireless gateway and communicates voice packets to the wireless gateway through a packet based protocol. Additionally, the RF network is coupled to the packet switched network and communicates data packets to the packet switched network through a packet based protocol.

In another embodiment, a wireline network is included and is coupled to the wireless core network. In this embodiment, the wireless gateway is coupled to the wireline network and the packet switched network is coupled to the wireline network. The RF network then communicates voice packets to the wireline network through the wireless gateway and communicates data packets to the wireline network through the packet switched network.

In another embodiment, the wireline network includes a wireline gateway coupled to the wireless gateway for communicating voice packets, a wireless access gateway coupled to the packet switched network for communicating data packets, and a wireline core network coupled to the wireline gateway and wireless access gateway for transmitting and receiving voice and data packets. The RF network communicates voice packets to and from the wireline core network through the wireless voice gateway and wireline gateway and communicates data packets to and from the wireline core network through the packet switched network and wireless access gateway.

A further understanding of the major advantages of the invention herein may be realized by reference to the remaining portions of the specification in the attached drawings.

DETAILED DESCRIPTION OF THE INVENTION

Figure 1:
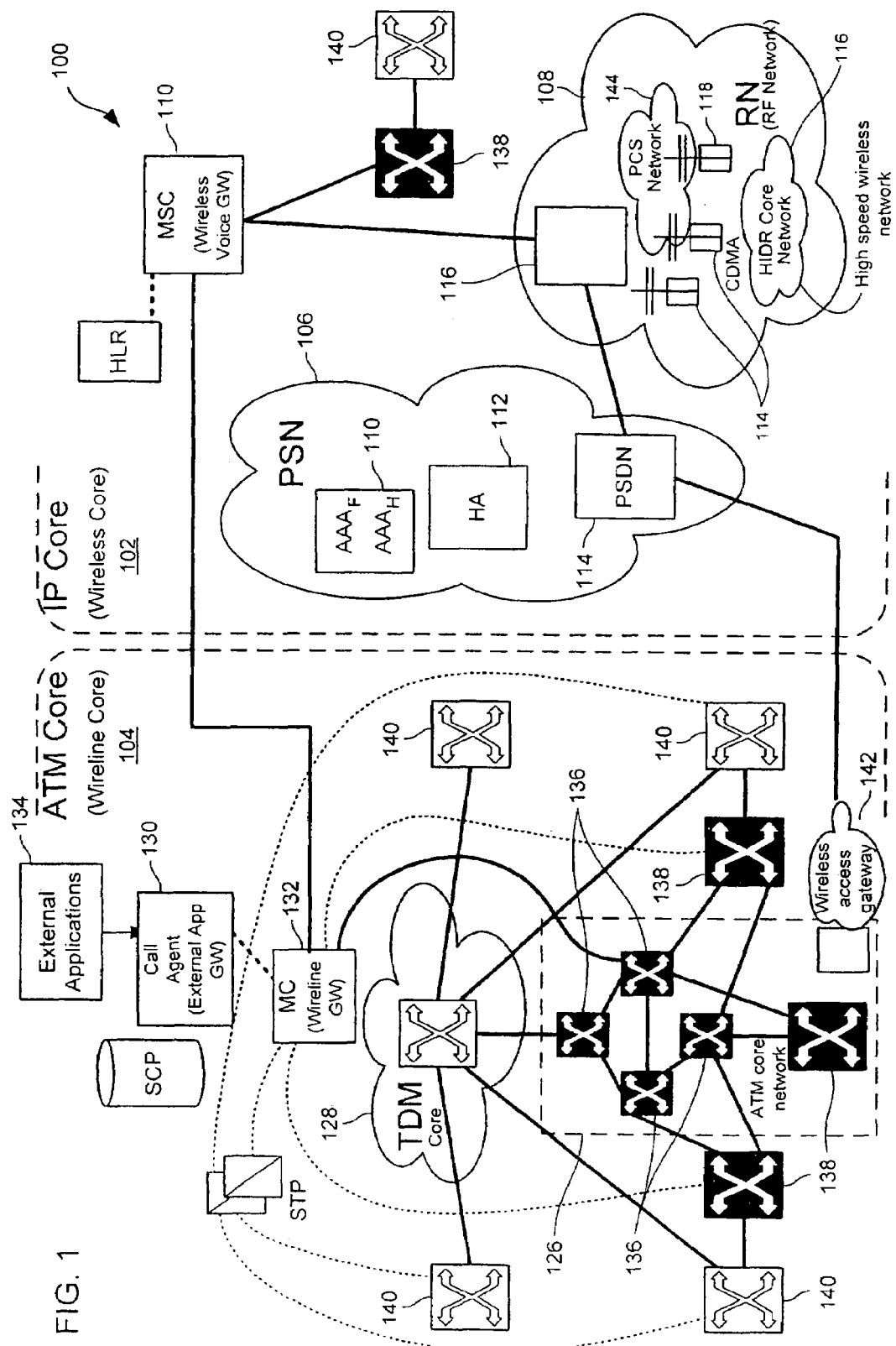
FIG. 1 illustrates a networking architecture integrating wireless data, voice, and/or video according to one embodiment.

FIG. 1 illustrates an embodiment of a networking architecture 100 integrating wireless data, voice, and/or video. Networking architecture 100 includes an Internet Protocol (IP) core 102 and an Asynchronous Transfer Mode (ATM) core 104. IP Core 102 includes a wireless network and ATM core 104 includes a wireline network according to one embodiment.

IP Core

IP core 102 may be any wireless network capable of transmitting voice, data, and/or video through a packet-based protocol. For discussion purposes, voice, data, and video may be used interchangeably and the use of voice, data, and/or video is not intended to limit embodiments of the invention to just voice, data, or video. In one embodiment, IP core 102 includes a Packet Switch Network (PSN) 106, a Radio Frequency (RF) network 108, and a Mobile Switching Center (MSC) 110. IP core 102 is designed in a layered architecture where different functions of the network are separated. For example, access, connectivity, control, and services are separated.

PSN 106 includes any network capable of transmitting and receiving packets of data through packet-based protocols, such as X.25, frame relay, Voice Over IP (VoIP), User Datagram Protocol (UDP), H323, SIP, MegaCo, and SS7 over IP and Transfer Control Protocol/IP (TCP/IP).

In one embodiment, PSN 106 includes authentication, accounting, and administrative (AAA) servers 110, a home agent (HA) 112, and a Packet Digital Service Node (PSDN) 114. It will be understood that PSN 106 is not limited to the shown elements and a person skilled in the art will appreciate other ways of implementing a packet switched network.

AAA servers 110 include servers that authenticate users of network 100. Additionally, AAA servers 110 provide accounting and administrative services for the users of network 100. For example, total minutes may be accrued and billing services may be provided by AAA servers 110.

HA 112 includes a location register, which registers users making calls on network 100. For example, when a user makes a data call from somewhere in network 100, HA 112 determines a home network for the user and registers the user in HA 112.

PSDN 114 is a data router and interface to RF network 108. PSDN 114 provides an interface from IP core 102 to ATM core 104 and routes data packets to and from IP core 102.

As shown, AAA servers 110, HA 112, and PSDN 114 are coupled to ATM core 104 through a wireless access gateway (WAG) 142. WAG 142 provides a gateway to ATM core network 126 for the transmission of data packets.

RF network 108 includes any radio frequency networks. For example, RF network 108 includes a Personal Communications Services (PCS) network 114 and High Speed Wireless Data Core (HIDR) network 116.

PCS 144 may be any Personal Communications Service (PCS) network capable of transmitting and receiving voice and data packets. For example, PCS 144 is a Code-Division Multiple Access (CDMA) network. In one embodiment, PCS 144 includes a Base Station Controller (BSC) 116 and base stations 118. In one embodiment, RF network 108 is configured for carrying voice and data through packet based protocols, such as Voice Over IP (VoIP), User Datagram Protocol (UDP), TCP/IP, H323, SIP, MegaCo, and SS7 over IP. It will be understood that PCS 144 is not limited to the shown elements and a person skilled in the art will appreciate other ways of implementing a PCS network.

BSC 116 is a controller providing a gateway for PCS 144 to other elements of network 100. In one embodiment, BSC 116 is a server and communicates with clients such as base stations 118 and other gateways PDSN 114 and MSC 110. BSC 116 transmits and receives voice, data, and video packets through packet based protocols.

MSC 110 is a wireless gateway between RF network 108 and ATM core 104. In one embodiment, MSC 110 is a server and communicates with clients such as BSC 106 and MGC 132 through a packet-based voice protocol.

HIDR 116 may be any high speed wireless network. For example, HIDR is a high speed Internet data RF network. HIDR 116 provides high speed wireless data access to users. For example, users may access HIDR 116 through a mobile internet connection with a computer, laptop, mobile computing device, handheld computer, cellular telephone, etc. HIDR 116 transmits data via a packet-based protocol to ATM core 104. Unlike PCS 144, HIDR 116 is not coupled to WAG 142 through PDSN 114.

IP Core 102 may also include traditional circuit switched network elements, such as a HLR, voice tandem, and class 5 switch. MSC 110 communicates with the circuit switched elements through a packet based protocol.

ATM Core

ATM core 104 includes an ATM core network 126, a call agent 130 and media gateway controller 132. In one embodiment, ATM core 104 includes a Time Division Multiplex (TDM) core 128. However, TDM core 128 may be replaced with an ATM core network.

TDM core 128 may be any circuit switched network capable of transmitting and receiving voice. In one embodiment, TDM core 128 includes switches 140, such as class 4 or 5 switches, coupled to ATM core network 126 through tandem voice gateways 138. Tandem voice gateways 128 may be a class 4 switch or voice tandem trunk gateway. TDM core 128 communicates through a circuit-switched protocol such as SS7. Switches 140 and tandem voice gateways 138 provide a gateway between circuit switched networks and packet switched networks. TDM core networks are known in the art and need not be discussed further.

ATM core network 126 may be any ATM network capable of transmitting and receiving data, voice, and video packets. In one embodiment, ATM core network 126 is a high speed optical network including VoIP state machines or controllers 136 and Wireless Access Gateway 142. It will be understood that ATM core 126 is not limited to the shown elements and a person skilled in the art will appreciate other ways of implementing an ATM network.

WAG 142 is a gateway coupling ATM core network 126 to IP core 102. WAG 142 is coupled to PSN 106 and more specifically, coupled to PDSN 114, AAA 110, and HA 112. Additionally, WAG 142 is coupled to RF network 108, specifically BSC 116 through PDSN 114 and HIDR 116. Also, WAG 142 is coupled to RF network 108 without being coupled through PSN 106. Specifically, WAG 142 is coupled to HIDR 116. WAG 142 is configured to send and receive data packets through a packet based protocol.

MGC 132 is a wireline gateway coupling ATM core 104 to IP core 102. Specifically, MGC 132 is coupled to MSC 110. Additionally, MGC 132 is coupled to IP core 102 through ATM core network 126 and WAG 142. MGC 132 is configured to send and receive voice through a packet-based protocol to MSC 110. Also, MGC 132 is configured to send and receive data and video through a packet based protocol through ATM core network 126 and WAG 142 to IP core 102.

In one embodiment, state machines and/or controllers 136 communicate through a packet based protocol, such as a Z.2931 UNI 4.0 protocol. Tandem voice gateways 138 are used to communicate voice and data packets using a packet-based protocol from ATM core network 126 to and from TDM core 128. Data packets may also be transmitted directly to TDM core 128 and MGC 132. Additionally, voice may be transmitted to and from MGC 132 to ATM core network 126 through tandem voice gateway 138. In one embodiment, voice packets are transmitted through a H.248 or similar protocols. Also, voice may be transmitted through STP 142 to switches 140. In one embodiment, STP 142 communicates through a SS7 protocol.

In one embodiment, call agent 130 provides a gateway to external applications 134, which may be integrated seamlessly into IP core 102 through MGC 132. Call agent 130 is a process that may be integrated in MGC 132 or operate independently from MGC 132. Examples of external applications 134 are applications developed by dot corn companies, Competitive Local Exchange Carriers, Internet Service Providers (ISPs), and internal applications developed by the network owner. Examples of applications are PC telephony, multimedia collaboration, voice mail, Centrex, directory services, enhanced services, unified messaging, instant messaging, etc. In one embodiment, external applications 134 communicate through packet-based voice, data, and/or video protocols and communicate with ATM core 104 and IP core 102 through call agent 130 and MGC 132.

External applications 134 may provide voice, data, and/or video services at any time. In order to integrate external applications 134 with RF network 108, RF network 108 is enabled to transmit and receive voice, data, and/or video packets. In one embodiment, voice is transmitted through a first path and data and video through a second path.

When voice services are provided, packets of voice data are sent through call agent 130 and MGC 132 of ATM core 104 to MSC 110 of IP core 102. The voice packets are then routed to BSC 116 of RF network 108. Additionally, when data or video services are provided, packets of data and video are routed through call agent 130, MGC 132, ATM core network 126, and WAG 142 to RF network 108. In one embodiment, the data and video packets are then routed to PSN 106 (specifically PDSN 114, AAA 110, and HA 112). Also, data and video is routed to BSC 116 of PCS network 142 from PDSN 114. In another embodiment, data and video is routed to RF network 108 (specifically HIDR 116) without being routed through PSN 106. Accordingly, applications providing voice, data, and/or video services may be seamlessly integrated with IP core 102 through call agent 120 and MGC 132.

Figure 2:
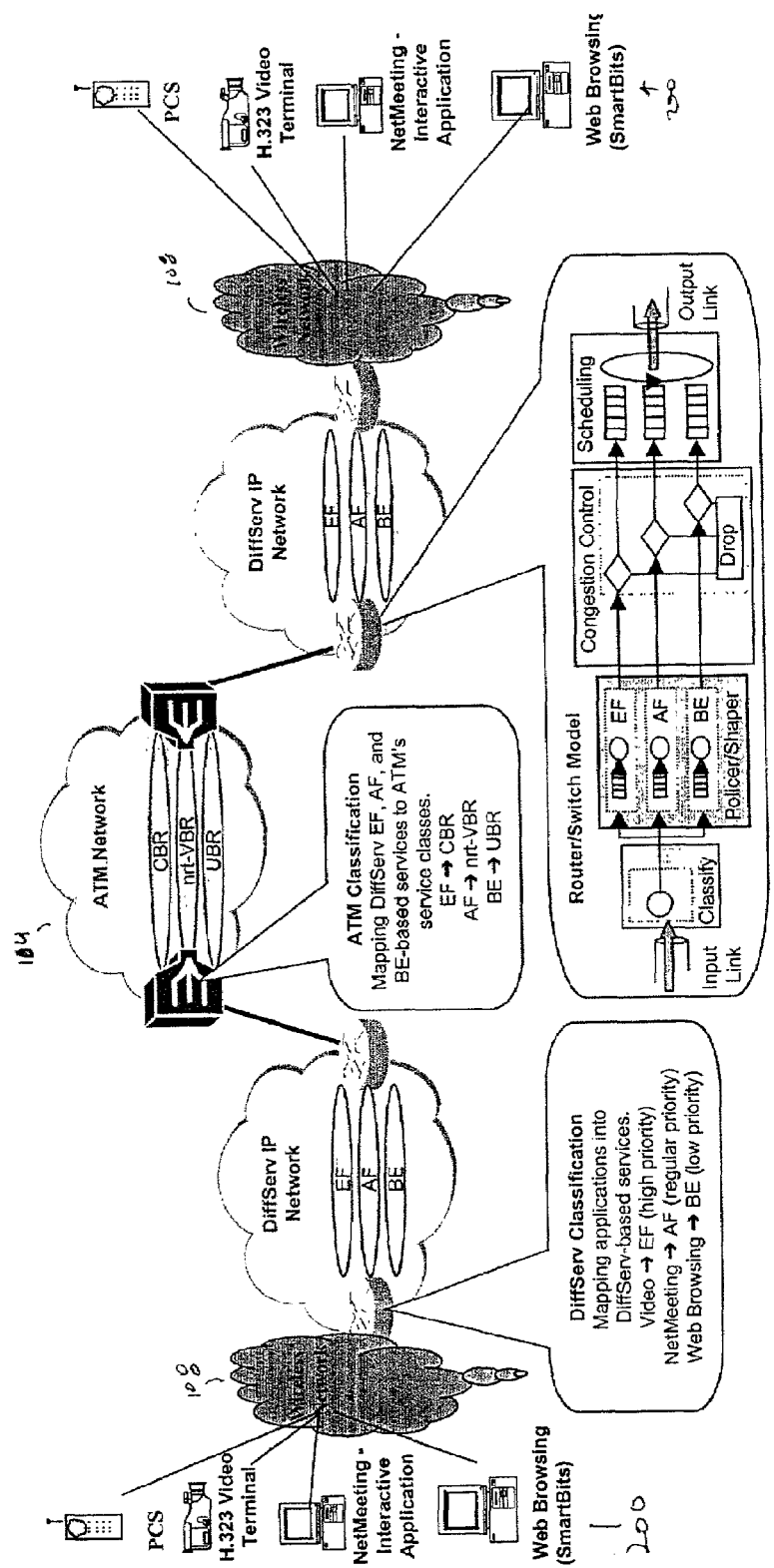
FIG. 2 illustrates a system and method of providing Quality of Service (QoS) in the networking architecture according to one embodiment.

FIG. 2 illustrates a system and method of providing Quality of Service (QoS) in IP Core 102 and ATM core 104 according to one embodiment. FIG. 2 shows a variety of applications 200 using network 100. For example, applications 200 may include a PCS cellular user, video terminal user, an Interactive application such as NetMeeting, and a Web browser. Applications 200 access RF network 108 and are assigned a priority based on the application being used. For example, in a DiffServ classification scheme, a high, regular, and low priority classification is assigned. In one embodiment, video is assigned a high priority, interactive applications assigned a regular priority, and web browsing assigned a low priority. It will be understood that different applications may be assigned different priorities based on the individual applications.

Once the applications are classified for IP core 102, voice, data, and/or video packets are routed to ATM core 104 with the assigned priority. ATM core 102 receives the classifications and schedules the applications based on the assigned priority. For example, high priority is assigned a constant bit rate classification, regular priority assigned a lip variable bit rate classification, and low priority assigned a unspecified bit rate classification.

Using the above described schema, QoS is provided to users of applications. Additionally, QoS for wireless and wireline networks are integrated.

The above description is illustrative but not restrictive. Many variations of the invention will become apparent to those skilled in the art upon review of this disclosure. The scope of the invention should, therefore, be determined not with reference to the above description, but instead should be determined with reference to the pending claims along with their full scope or equivalents.

What is claimed is:

1. A wireless and wireline network for transmitting voice and data comprising:
   a wireline core comprising
     a wireline gateway coupled to the wireless network for communicating voice packets,
     a wireless access gateway coupled to the wireless network for communicating data packets, and
     a wireline core network coupled to the wireline gateway and wireless access gateway for communicating voice and data packets,
   a wireless core comprising
     a wireless voice gateway coupled to the wireline gateway for communicating voice packets,
     a packet switched network coupled to the wireless access gateway for communicating data packets, and
     a Radio Frequency (RF) network coupled to the wireless voice gateway and packet switched network for communicating data and voice packets, wherein the RF network communicates voice packets between the wireline core network through the wireless voice gateway and wireline gateway and communicates data packets between the wireline core network through the packet switched network and wireless access gateway; and
   an external application gateway for coupling external applications to the wireline and wireless network wherein the external applications communicate voice packets between the RF network through the wireline gateway and wireless voice gateway and communicate data packets between the RF network through the wireline core network, wireless access gateway, and packet switched network.

2. The wireless and wireline network of claim 1, further comprising a Time Division Multiplex (TDM) core network comprising:
   a plurality of circuit switches for communicating circuit switched voice signals; and
   a plurality of tandem circuit switches coupled to the circuit switches and wireline core network for communicating circuit switched voice signals to and from the TDM core network and an ATM core network.

3. The wireless and wireline network of claim 1, wherein the wireless core is an Internet Protocol (IP) core.

4. The wireless and wireline network of claim 1, wherein the wireline core is an Asynchronous Transfer Mode (ATM) core.

5. The wireless and wireline network of claim 1, wherein the wireless core comprises a Personal Communications Services (PCS) network.

6. The wireless and wireline network of claim 1, wherein the RF network comprises a data network, wherein the data network communicates data packets to and from the wireline core network through the wireless access gateway.

* * * * *